(12) United States Patent
Jiang et al.

(10) Patent No.: US 9,071,538 B2
(45) Date of Patent: Jun. 30, 2015

(54) METHOD FOR DYNAMICALLY ADJUSTING SWITCHING LOOP AND NETWORK EQUIPMENT

(75) Inventors: Wei Jiang, Shenzhen (CN); Jun Zhang, Shenzhen (CN); Guanwei Liu, Shenzhen (CN); Wei Bao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 336 days.

(21) Appl. No.: 13/699,153

(22) PCT Filed: Apr. 8, 2011

(86) PCT No.: PCT/CN2011/072551
§ 371 (c)(1),
(2), (4) Date: Nov. 20, 2012

(87) PCT Pub. No.: WO2011/147229
PCT Pub. Date: Dec. 1, 2011

(65) Prior Publication Data
US 2013/0064130 A1    Mar. 14, 2013

(30) Foreign Application Priority Data

May 24, 2010    (CN) .......................... 2010 1 0189509

(51) Int. Cl.
*H04L 12/26* (2006.01)
*H04L 12/705* (2013.01)
*H04L 12/707* (2013.01)

(52) U.S. Cl.
CPC ................ *H04L 45/18* (2013.01); *H04L 45/22* (2013.01)

(58) Field of Classification Search
CPC ... H04W 24/00; H04L 43/50; H04L 43/0852; H04L 43/08; H04B 17/003
USPC ......................................... 370/252, 235, 230
See application file for complete search history.

(56) References Cited

U.S. PATENT DOCUMENTS

| 6,034,946 A * | 3/2000 | Roginsky et al. ............. 370/238 |
| 6,771,700 B1 * | 8/2004 | Razoumov et al. ........... 375/227 |

(Continued)

FOREIGN PATENT DOCUMENTS

| CN | 1567891 A | 1/2005 |
| CN | 1606850 A | 4/2005 |

(Continued)

OTHER PUBLICATIONS

International Search Report in international application No. PCT/CN2011/072551, mailed on Jul. 7, 2011.

(Continued)

*Primary Examiner* — Eunsook Choi
*Assistant Examiner* — Siren Wei
(74) *Attorney, Agent, or Firm* — Oppedahl Patent Law Firm LLC (57) ABSTRACT

The disclosure provides a method for dynamically adjusting a switching loop. The method comprises the following steps: a network equipment in the switching loop determines current link costs of all links connected with the network equipment, wherein the network equipment determines the current link costs of the links according to initial link costs and link adjustment parameters of the links (S201); then the network equipment acquires the current link costs of all the links in the switching loop, and determines a main link of the switching loop, wherein the current link cost of the main link is less than or equal to a preset link cost (S203). The disclosure also provides a network equipment. With the solution of the disclosure, the link actually having an optimal link cost can be determined as the main link according to the current link cost, thus the problem in the related art that the transmission efficiency of the whole network is influenced by reason of determining the link having a worse current link cost as the main link is avoided, and the transmission efficiency and reliability of the main link and the whole network are improved.

14 Claims, 4 Drawing Sheets

---

A network equipment in the switching loop determines current link costs of all links connected with the network equipment, wherein the network equipment determines the current link costs of the links according to initial link costs and link adjustment parameters of the links — S201

The network equipment acquires the current link costs of all the links in the switching loop, and determines a main link of the switching loop, wherein the current link cost of the main link is less than or equal to a preset link cost — S203

(56) References Cited

U.S. PATENT DOCUMENTS

2003/0031126 A1* 2/2003 Mayweather et al. ........ 370/223
2008/0101227 A1* 5/2008 Fujita et al. ................. 370/232

FOREIGN PATENT DOCUMENTS

| CN | 1859049 A | 11/2006 | | |
| CN | 101651600 A | 2/2010 | | |
| CN | 101860484 A | 10/2010 | | |
| WO | WO 2009113976 A1 * | 9/2009 | .............. | H04L 12/56 |

OTHER PUBLICATIONS

English Translation of the Written Opinion of the International Search Authority in international application No. PCT/CN2011/072551, mailed on Jul. 7, 2011.

* cited by examiner

METHOD FOR DYNAMICALLY ADJUSTING SWITCHING LOOP AND NETWORK EQUIPMENT

TECHNICAL FIELD

The disclosure relates to the field of communications, and in particular to a method for dynamically adjusting a switching loop and a network equipment.

BACKGROUND

Figure 1:
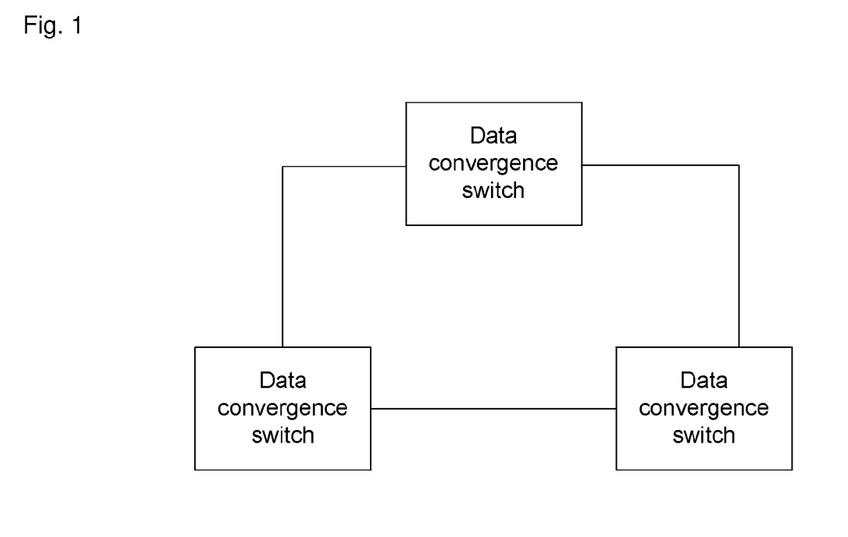
FIG. 1 shows a diagram of a convergence loop network according to the related art.

At present, a convergence network mainly consists of data convergence switches. However, it is easy to generate a layer-2 switching loop in the convergence network when the data convergence switches are used at present. For example, FIG. 1 shows a switching loop generated by three data convergence switches in a convergence network.

In order to solve the problem of layer-2 switching loop in the convergence network, network redundant links are selected and blocked mainly according to parameters like link costs of links, through layer-2 protocols such as Spanning Tree Protocol (STP) and Ethernet Automatic Protection Switching (EAPS), so that the links are disconnected.

After the links are disconnected by the above way, the disconnected links are still connected physically. The disconnected links cannot transmit service data but still can transmit protocol messages.

In existing protocols, link cost is determined by the transmission efficiency of the link, while the transmission efficiency of the link is only determined by the type of the link. Common link types mainly include optic fibre transmission and cable transmission; once a convergence network is established, the type of the link between every two data convergence switches is fixed; once the type of the link is fixed, the initial transmission efficiency of the link can be determined; and once the initial transmission efficiency of the link is fixed, the link cost of the link can be determined. Generally, the transmission efficiency of a link is in inverse proportion to the link cost of the link, for example, for a link with the initial transmission efficiency of 10M, the initial link cost of the link is 2000000; for a link with the initial transmission efficiency of 100M, the initial link cost of the link is 200000; for a link with the initial transmission efficiency of 1000M, the initial link cost of the link is 20000.

In order to solve the problem of layer-2 switching loop in the convergence network, generally layer-2 protocols such as STP and EAPS can be adopted to disconnect the link having a worse initial link cost (that is, the link with a lower initial transmission efficiency) in the switching loop according to the initial link cost of the link, so as to select the link having the minimum initial link cost (that is, the link with a higher initial transmission efficiency) in the switching loop as the main link.

However, in the above scheme of redundant link blocking (disconnecting), when a switching loop is selected, only the link type (that is, the corresponding initial link cost) of the link, rather than the dynamic change of the link cost of the link is taken into account, therefore, the link with a smaller initial link cost but actually having a low transmission efficiency may probably be selected as the main link, and other links with a relatively bigger initial link cost but actually having a better transmission efficiency are disconnected and in a blocked state, thus affecting the efficiency and reliability of service transmission in the convergence network.

Similarly, in other layers in the switching loop, similar problems may also appear.

In view of the problem in related art that the transmission efficiency and reliability of the convergence network are impacted by reason of determining the link actually having a worse link cost as the main link when a switching loop is blocked, no effective solution has been proposed so far.

SUMMARY

In view of the problem in related art that the transmission efficiency and reliability of the convergence network are affected by reason of determining the link actually having a worse link cost as the main link when a switching loop is blocked, the disclosure provides a method for dynamically adjusting a switching loop and a convergence access equipment, which can avoid the problem in the related art that the transmission efficiency and reliability of the network are affected due to the actual worse link cost of the main link, and can ensure the transmission efficiency of the main link.

The technical solutions of the disclosure are realized as follows.

The disclosure provides a method for dynamically adjusting a switching loop, which includes:

determining, by a network equipment in the switching loop, current link costs of all links connected with the network equipment, wherein the network equipment determines the current link costs of the links according to initial link costs and link adjustment parameters of the links;

acquiring, by the network equipment, the current link costs of all the links in the switching loop, and determining a main link of the switching loop, wherein the current link cost of the main link is less than or equal to a preset link cost.

In the above solution, determining a main link of the switching loop may include: preferentially determining the link having the minimum current link cost in the switching loop as the main link of the switching loop.

In the above solution, the link adjustment parameter may include one of the following: packet loss rate of a link, frame error rate of a link.

In the above solution, determining, by the network equipment, the current link costs of the links according to the initial link costs and link adjustment parameters of the links may include: $A'=A/(1-V)$, where $A'$ represents the current link cost of the link, $A$ represents the initial link cost of the link, $V$ represents the link adjustment parameter of the link, $0 \le V < 1$.

In the above solution, when the link adjustment parameter is the packet loss rate of the link, the packet loss rate $V$ may be calculated based on the following formula: $V=(P-Q)/P$, where $P$ represents the number of messages sent to the network equipment by another network equipment which is connected with the network equipment through the link, $Q$ represents the number of messages received by the network equipment from the another network equipment.

In the above solution, the network equipment may obtain the number of messages sent/received, through an Operation, Administration and Maintenance (OAM) protocol.

In the above solution, when the link adjustment parameter is the frame error rate of the link, the frame error rate $V$ may be calculated based on the following formula: $V=S/(S+D)$, where $S$ represents the number of bad frames received by the network equipment from another network equipment through the link within a period of time, $D$ represents the number of good frames received by the network equipment from the another network equipment through the link within the period of time.

In the above solution, the method may further include: preferentially determining the link having the maximum current link cost in the switching loop as the link needing to be blocked.

The disclosure also provides a network equipment, which includes: a first determination module and a second determination module, wherein the first determination module is configured to determine current link costs of all links connected with the network equipment, wherein the network equipment determines the current link costs of the links according to initial link costs and link adjustment parameters of the links; and the second determination module is configured to acquire the current link costs of all the links in a switching loop in which the network equipment is located, and to determine a main link of the switching loop, wherein the current link cost of the main link is less than or equal to a preset link cost.

In the above solution, the first determination module may determine the current link costs of the links according to the following formula: $A'=A/(1-V)$, where $A'$ represents the current link cost of the link, A represents initial link cost of the link, V represents the link adjustment parameter of the link, $0 \le V < 1$.

In the above solution, the second determination module may be specifically configured to preferentially determine the link having the minimum current link cost in the switching loop as the main link of the switching loop, and to preferentially determine the link having the maximum current link cost in the switching loop as the link needing to be blocked.

With the above technical solution of the disclosure, by reference to the current link cost which can accurately reflect the actual condition of a link, the link actually having an optimal link cost can be determined as the main link according to the current link cost, thus the problem in the related art that the transmission efficiency of the whole network is influenced by reason of determining the link having a worse current link cost as the main link is avoided, the adjustment on the switching loop can be optimized reasonably, and the transmission efficiency and reliability of the main link and the whole network are improved.

DETAILED DESCRIPTION

In view of the problem in the related art that the transmission efficiency and reliability of the convergence network are affected by reason of determining the link actually having a low transmission efficiency (that is, having a worse link cost) as the main link when a switching loop is blocked, the embodiment of the disclosure provides a solution for adjusting a switching loop, which can dynamically adjust the switching loop network path of each layer (such as convergence layer) in the switching loop, so that the network equipment in the link can determine the link actually having an optimal link cost as the main link according to the current link cost, thus the problem in the related art that the whole transmission efficiency of the network is influenced by reason of determining the link having a worse current link cost as the main link is avoided, the adjustment on the switching loop can be optimized reasonably, and the transmission efficiency and reliability of the main link and the whole network are improved.

The disclosure is described below in detail in conjunction with accompanying drawings.

Figure 2:
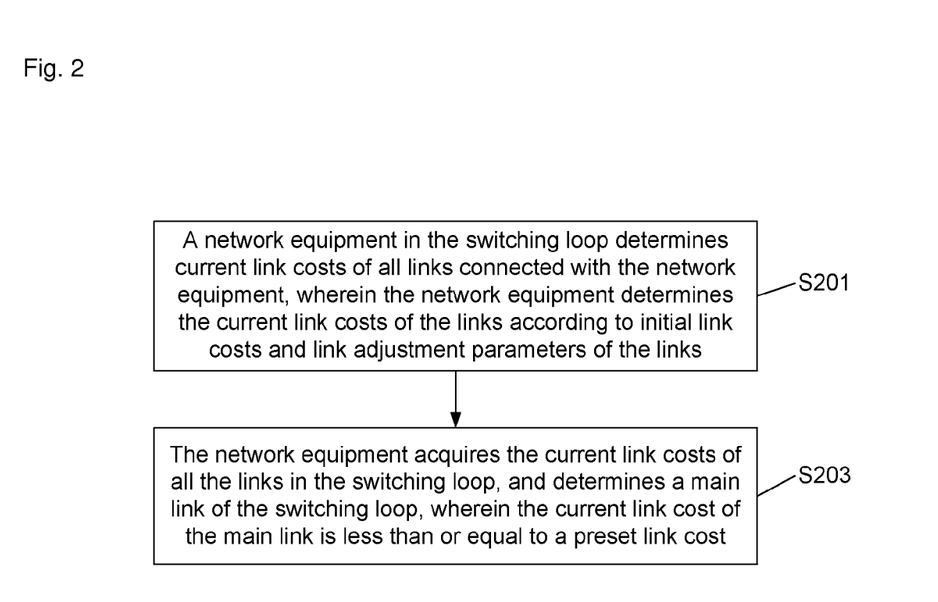
FIG. 2 shows a flowchart of a method for adjusting a switching loop according to an embodiment of the disclosure.

FIG. 2 shows a flowchart of a method for adjusting a switching loop according to an embodiment of the disclosure; as shown in FIG. 1, the method includes the following steps:

Step 201: a network equipment in the switching loop determines current link costs of all links connected with the network equipment, wherein the network equipment determines the current link costs (which can be specific numerical values) of the links according to the initial link costs and link adjustment parameters of the links.

Step 203: the network equipment acquires the current link costs of all the links in the switching loop, and determines a main link of the switching loop, wherein the current link cost of the main link is less than or equal to a preset link cost, that is, the link with the current link cost superior to the preset link cost in the switching loop is determined as the main link of the switching loop.

Compared with the solution in the related art that the main link is determined according to the initial link cost, the above process refers to the current link cost which can accurately reflect the actual condition of the link when determining the main link, thus the link actually having an optimal link cost can be determined as the main link according to the current link cost, the problem in the related art that the whole transmission efficiency of the network is influenced by reason of determining the link having a worse current link cost as the main link is avoided, the adjustment on the switching loop can be optimized reasonably, and the transmission efficiency and reliability of the main link and the whole network are improved.

In the switching loop, a link can interconnect two network equipments; when the current link cost of a link is determined, the network equipment at any end of the link can determine the current link cost of the link. Moreover, the current link cost of the link can also be determined by the two network equipments at both two ends of the link as required, then averaging, weighing or other processing is performed on the results obtained by the two network equipments, and the final obtained result is taken as the current link cost of the link.

Moreover, in order to ensure the transmission efficiency of the main link, the link having the minimum current link cost in the switching loop can be preferentially determined as the main link of the switching loop.

The process that the network equipment determines the current link cost of a link connected with the network equipment is described below in detail.

Optionally, when the current link cost of a link is determined, the link adjustment parameter referred to can be the packet loss rate of the link or the frame error rate of the link.

Moreover, the network equipment can determine the current link cost of a link according to the following formula:

$$A'=A/(1-V),$$

where A' represents the current link cost of the link, A represents the initial link cost of the link, V represents the link adjustment parameter of the link, $0 \le V < 1$.

If the link adjustment parameter is the packet loss rate of the link, then the packet loss rate V can be calculated based on the following formula:

$$V=(P-Q)/P,$$

where P represents the number of messages sent to a network equipment by another network equipment which is connected with the network equipment through the link, Q represents the number of messages received by the network equipment from the another network equipment.

For example, assuming a network equipment A is connected to a network equipment B through a link 1, in this case, the network equipment B would send data messages to the network equipment A and the network equipment B would inform the network equipment A of the total number of the data messages the network equipment B sends to the network equipment A, then the network equipment A can determine the packet loss rate of the link 1 according to the number of the data messages actually received by the network equipment A from the network equipment B (that is, Q) and the total number of the data messages which is actually sent from the network equipment B to the network equipment A and notified by the network equipment B (that is, P).

When the equipments at both two ends of the link determine the current link cost or only the network equipment B determines the current link cost, the network equipment B would receive the messages which are sent through this link by the network equipment A too, then the network equipment B determines the packet loss rate of this link according to the number of the messages actually received and the total number of the messages sent by the network equipment A.

The above network equipment A or B generally obtains the number of messages sent/received, through an OAM protocol.

In addition, if the link adjustment parameter is the frame error rate of the link, then the frame error rate V is calculated based on the following formula:

$$V=S/(S+D),$$

where S represents the number of bad frames which are received by a network equipment from another network equipment through the link within a period of time, D represents the number of good frames which are received by the network equipment from the another network equipment through the link within the period of time.

Specifically, also assuming the network equipment A is connected to the network equipment B through a link 1, in this case, the network equipment B would send data frames to the network equipment A, and the network equipment A can determine the frame error rate of the link 1 according to the number of good frames received from the network equipment B (that is, D) and the number of good frames received from the network equipment B (that is, S), and thus the network equipment A can determine the current link cost of the link 1.

When the equipments at two ends of the link both determine the current link cost or only the network equipment B determines the current link cost, the network equipment B would receive the data frames which are sent through this link by the network equipment A too, then the network equipment B determines the frame error rate according to the number of good frames actually received and the number of bad frames actually received, and thus determines the current link cost of the link.

After the current link cost of the link is determined, the link having the maximum current link cost in the switching loop can be preferentially determined as the link needing to be blocked, that is, the link having the worst current link cost in the switching loop is determined as the link needing to be blocked.

It should be noted that the description above provides the specific implementation of determining the current link cost according to the frame error rate or the packet loss rate; however, in actual application, other parameters of the link can also be taken as the reference for determining the current link cost, moreover, according to different selected parameters, the formula adopted in the determination process is not limited to A'=A/(1−V), which is not enumerated herein.

Preferably, in the above process, the link costs of the local end and the opposite end can be acquired based on an OAM link monitoring function of Ethernet; and the end link cost for the routing of the loop network is dynamically allocated or adjusted through the link costs (that is, the current link cost of each link is analyzed).

Figure 3:
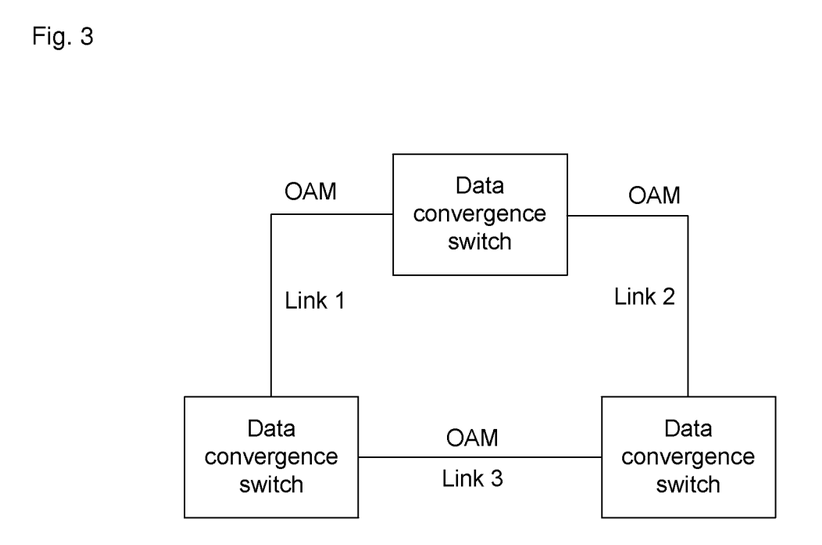
FIG. 3 shows a diagram of a convergence loop network according to an embodiment of the disclosure.

The above process can be applied to each layer in the switching loop, for example, when the above process is applied to the convergence layer (that is, layer 2), the processing executed by the network equipment above can be implemented by the convergence access equipment, and the updated end link cost is used for dynamically adjusting the path of the layer-2 switching loop network (in which, the path mentioned in the disclosure does not mean that all links in all switching loops must be in non-blocked state, since the physical links between the network equipments always exists, even if part of links in the switching loop are in the blocked state, that is, the link cannot transmit service data, however, the switching loop is still interconnected in this case); in this case, as shown in FIG. 3, all links among multiple convergence access equipments, that is, all links among data convergence switches, are based on the OAM protocol.

For a clear description, the disclosure is described below by making the convergence access equipment be a data convergence switch, and taking the STP protocol family and EAPS protocol in the layer-2 switching loop network for example, wherein the STP protocol family includes STP, Rapid Spanning Tree Protocol (RSTP) and Multiple Spanning Tree Protocol (MSTP), but is not limited to these; The cases under other loop network routing protocols also can be implemented through this disclosure and, which are included within the scope of protection of the disclosure.

Embodiment 1

Figure 4:
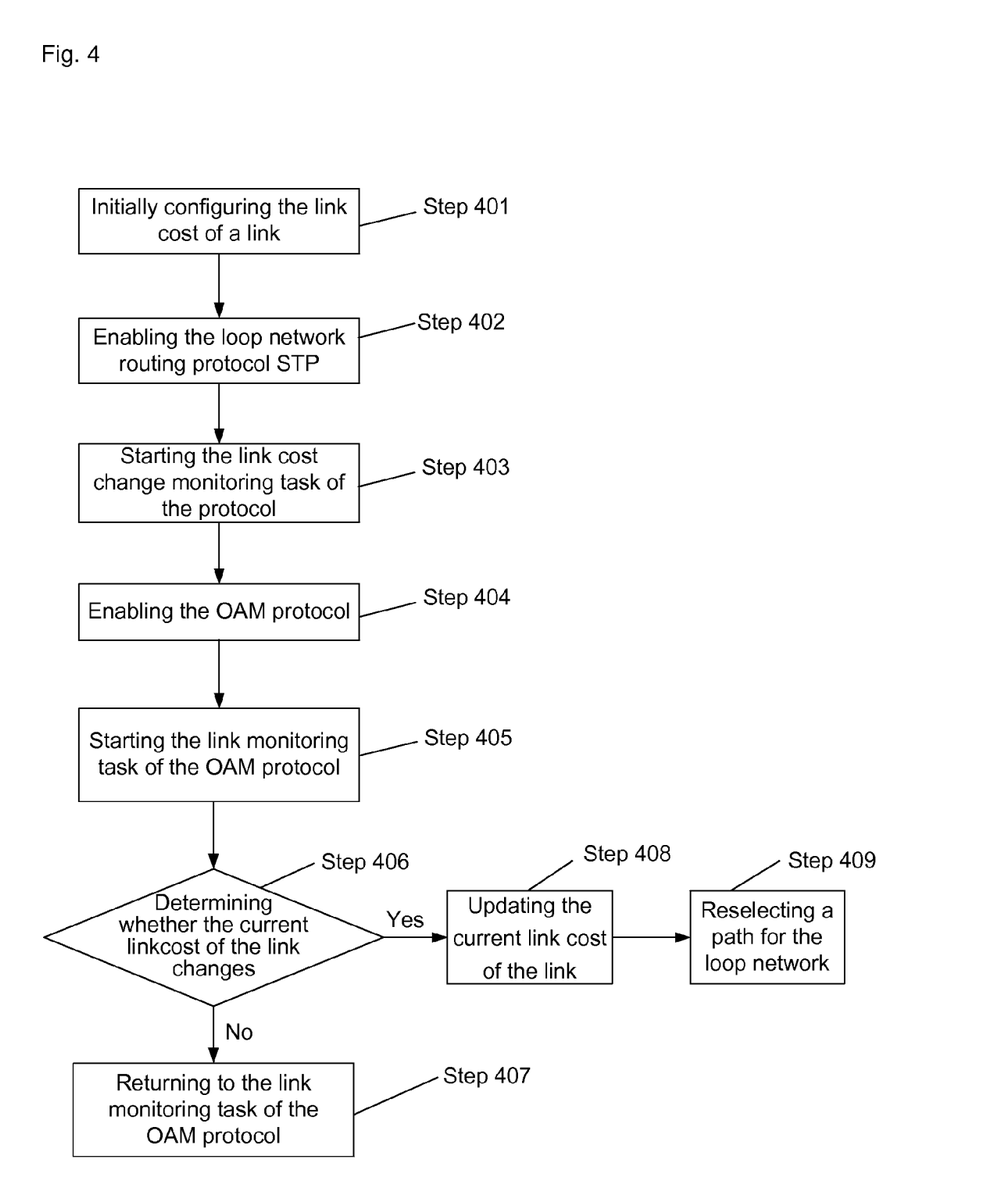
FIG. 4 shows a flowchart of adjusting a loop network path through an STP in the method for adjusting the switching loop according to an embodiment of the disclosure.

FIG. 4 shows a processing flowchart of dynamically adjusting a loop network through an STP protocol according to an embodiment of the disclosure; as shown in FIG. 4, the process includes the following steps.

Step 401: initially configuring the link cost of a link.

Specifically, the initial link cost and other costs of the link between every two data convergence switches are initially configured, wherein the initial link cost of the link is determined by the transmission efficiency of the link, while the initial transmission efficiency of the link is determined by the type of the link only; wherein, the initial transmission efficiency of the link may be 10M or 100M or 1000M; the bigger the numerical value of the initial transmission efficiency of the link is, the smaller the initial link cost of the link is, that is, the better the link is; other costs may include switch ID, switch priority, port priority and the like.

Step 402: enabling the loop network routing protocol STP.

Here, according to the protocol STP, selective blocking is carried out according to default link costs and other costs to maintain the only one L2 data service channel in the network.

Step 403: starting the link cost change monitoring task of the protocol.

In this step, for each data convergence switch, dynamic link parameters, such as packet loss rate and frame error rate, of each link connected with the data convergence switch is mainly monitored within a period of time.

Step 404: enabling the OAM protocol.

In the specific implementation, it is needed to enable the OAM protocol in the data convergence switches at both the local end and the opposite end, and to configure corresponding dynamic link parameters, so that the OAM protocol operates normally.

Step 405: starting the link monitoring task of the OAM protocol.

In this step, the link monitoring task of the OAM protocol of each data convergence switch is to monitor the dynamic link parameters such as packet loss rate and frame error rate of the link within a period of time and to adjust the initial transmission efficiency of the link according to the dynamic link parameters to obtain the current transmission efficiency of the link. The method for adjusting the transmission efficiency is described below.

Taking FIG. 1 for example, assuming the initial transmission efficiencies of the link 1, the link 2 and the link 3 are 10M, 100M and 1000M respectively, and the corresponding link cost is A; since the bigger the numerical value of the transmission efficiency is, the smaller the corresponding link cost is, that is, the higher the transmission efficiency of the link is; therefore, the transmission efficiency of the link 3 is the highest, and the transmission efficiency of the link 1 is the lowest. The dynamic link parameters of the link can be monitored, for example, packet loss rate (that is, lossRate, 0<=lossRate<1) can be monitored, wherein the method for calculating the packet loss rate has been described in detail in the foregoing part and is not repeated here. In this case, the current link cost of each link can be calculated by the following formula:

$$\text{current link cost } A'=A/(1-\text{lossRate}).$$

Step 406: determining, by the data convergence switch, whether the current link cost of the link changes after calculating the current link cost of the link in Step 405, if so, entering Step 408; otherwise, entering Step 407.

Step 407: returning to the link monitoring task of the OAM protocol and beginning new monitoring in a preset period of time.

Step 408: updating, by the data convergence switch, the current link cost of the link, and entering Step 409.

Step 409: reselecting a path for the loop network, and returning to the link monitoring task of the OAM protocol.

Specifically, the loop network routing protocol would reselect a path for the loop network according to the updated link cost of each link, for example, preferentially select the link having the minimum current link cost in the switching loop as the main link of the layer-2 switching loop network, and preferentially select the link having the maximum current link cost in the switching loop as the link needing to be blocked in the layer-2 switching loop network, so as to reduce the link cost of the layer-2 data services and ensure the reliability of service data transmission.

Embodiment 2

Application of the disclosure in EAPS protocol:

the EAPS protocol performs loop network routing through the on-off of link; considering the influence on the link efficiency in the disclosure, a field slaveLinkCost indicating the link cost of a slave link can be added in EAPS protocol messages.

Figure 5:
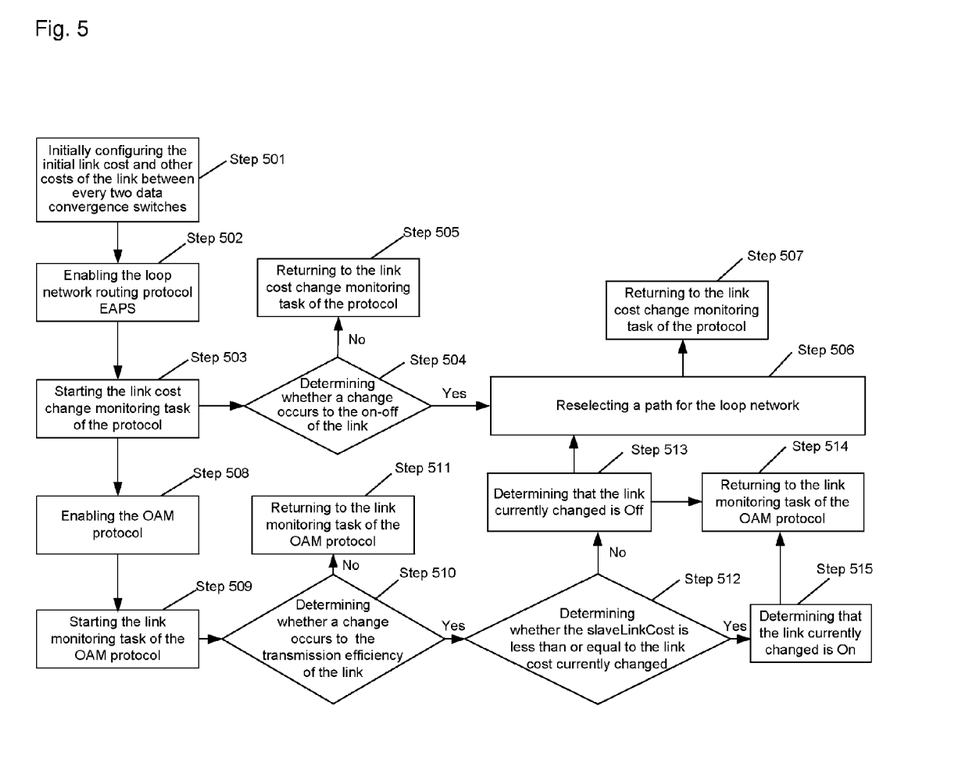
FIG. 5 shows a flowchart of adjusting a loop network path through an EAPS protocol in the method for adjusting the switching loop according to an embodiment of the disclosure.

FIG. 5 shows a processing flowchart of dynamically adjusting a loop network through an EAPS protocol according to an embodiment of the disclosure; as shown in FIG. 5, the process includes the following steps.

Step 501: initially configuring the initial link cost and other costs of the link between every two data convergence switches. This step is similar to Step 401 and no further description is needed here; specifically, the link cost of the link can be initially configured through a routing control unit of the loop network.

Step 502: enabling the loop network routing protocol EAPS. In the specific implementation, the loop network routing protocol EAPS selects a main path according to a default master-slave configuration and blocks the slave path; in this case, the link cost of each link in the whole network is the same, and the unique slave link cost of the whole network, that is, slaveLinkCost is transmitted through the protocol message.

Step 503: starting the link cost change monitoring task of the protocol, and executing Step 504 and Step 508.

In the specific implementation, the scope of the protocol link cost is relevant to the specific routing protocol of the loop network, for example, in the EAPS, the conventional method is based on the on-off of the link. This step adopts the processing mode of the conventional layer-2 switching loop network; when a change is monitored on the on-off of the link, a rerouting operation of the loop network would be performed.

Step 504: monitoring the on-off of the link, determining whether a change occurs to the on-off of the link, if so, executing Step 506; otherwise, executing Step 505.

Step 505: returning to the link cost change monitoring task in the condition that no change occurs to the on-off of the link.

Step 506: reselecting a path for the loop network, then executing Step 507.

Step 507: returning to the link cost change monitoring task after selecting the path for the loop network.

Step 508: enabling the OAM protocol. This step is executed concurrently with Step 504 after Step 503.

In the specific implementation, it is needed to enable the OAM protocol at both the local end and the opposite end, and to configure corresponding parameters, so that the OAM protocol operates normally.

Step 509: starting the link monitoring task of the OAM protocol.

In the specific implementation, the link monitoring task of the OAM protocol is to monitor the transmission efficiency of the link such as packet loss rate and frame error rate within a recent period of time.

Step 510: determining whether a change occurs to the transmission efficiency of the link, if no change occurs to the transmission efficiency of the link, executing Step 511; if a change occurs to the transmission efficiency of the link, executing Step 512.

Step 511: returning to the link monitoring task of the OAM protocol.

Step 512: determining whether the slaveLinkCost is less than or equal to the link cost currently changed.

In the specific implementation, when the monitor result exceeds a preset threshold, the link cost of the end would be updated dynamically according to modification criteria. A brief description is provided below by taking the following modification criteria for example.

Assuming the initial link cost of a link is linkCost (the smaller the numerical value is, the better the link is; the link cost of the whole network is the same initially, and there is linkCost=slaveLinkCost), the packet loss rate of the link is lossRate (0<=lossRate<1), then the modification criteria can be defined as:

updated link cost linkCost'=linkCost/(1−lossRate).

If linkCost'>slaveLinkCost (that is, the determination result in Step 512 is that the slaveLinkCost is not higher than the link cost), it is considered that the current link is not better than the slave link, and the link currently changed can be considered to be Off, then the path of the loop network is reselected, and the slaveLinkCost is also updated, that is, the slaveLinkCost is guaranteed to be the biggest cost in all links.

If linkCost'<slaveLinkCost (that is, the determination result in Step 512 is that the slaveLinkCost is higher than the link cost), it is considered that the current link is better than the slave link, and the link currently changed can be considered to be On, then the path of the loop network is reselected, and the slaveLinkCost is also updated.

That is to say, if the determination result in Step 512 is that the slaveLinkCost is higher than the link cost, execute Step 515; otherwise, execute Step 513.

Step 513: executing Step 506 and Step 514 when determining that the link currently changed is Off.

Step 514: returning to the link monitoring task of the OAM protocol.

Step 515: executing Step 514 when determining that the link currently changed is On, to return to the link monitoring task of the OAM protocol.

In this way, the transmission efficiency and reliability of layer-2 data services are improved by selecting the link with the highest transmission efficiency (that is, the link with the minimum link cost) as the path of the layer-2 switching loop network.

Figure 6:
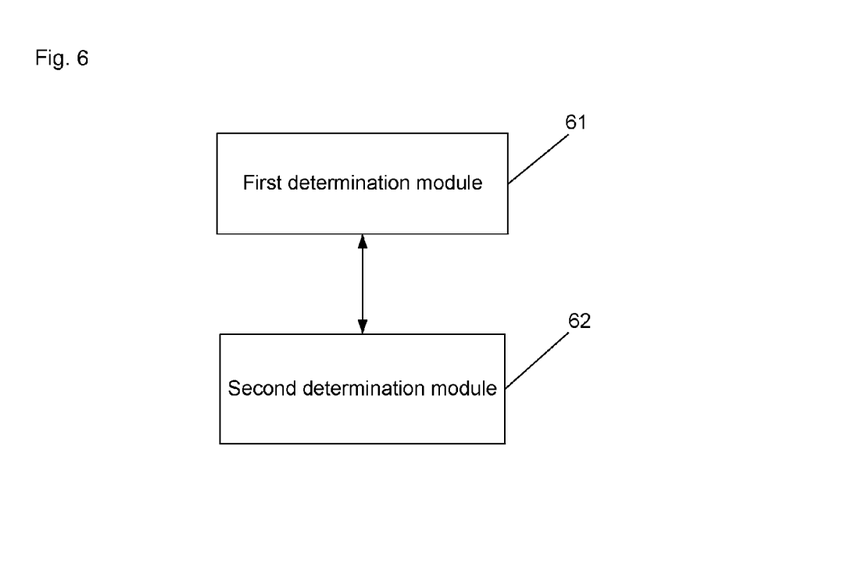
FIG. 6 shows a block diagram of a convergence access equipment according to an embodiment of the disclosure.

FIG. 6 shows a block diagram of a network equipment according to an embodiment of the disclosure; the network equipment according to the embodiment of the disclosure, as shown in FIG. 6, includes:

a first determination module 61, which is configured to determine current link costs of all links connected with the network equipment, wherein the network equipment determines the current link costs of the links according to the initial link costs and link adjustment parameters of the links; and a second determination module 62, which is configured to acquire the current link costs of all the links in a switching loop in which the network equipment is located, and to determine a main link of the switching loop, wherein the current link cost of the main link is less than or equal to a preset link cost.

The link adjustment parameter includes one of the following: packet loss rate of a link, frame error rate of a link.

The first determination module 61 can determine the current link costs of the links according to the initial link costs and link adjustment parameters of the links by reference to the following formula: A'=A/(1−V), where A' represents the current link cost of the link, A represents the initial link cost of the link, V represents the link adjustment parameter of the link, and there is 0≤V<1.

The second determination module 62 is specifically configured to preferentially determine the link having the minimum current link cost in the switching loop as the main link of the switching loop, and to preferentially determine the link having the maximum current link cost in the switching loop as the link needing to be blocked.

In the switching loop containing multiple network equipments above, a link can interconnect two network equipments; when the current link cost of the link is determined, the network equipment at any end of the link can determine the current link cost of the link. Moreover, the current link cost of the link can also be determined by the two network equipments at both two ends of the link as required, then averaging, weighing or other processing is performed on the results obtained by the two network equipments, and the final obtained result is taken as the current link cost of the link. Therefore, the first determination module 61 may be configured to directly determine the current link costs of all links of the network equipment, and may also be configured to determine the link costs of part designated links of the network equipment.

In the switching loop consisting of multiple network equipments according to the embodiment of the disclosure, for each link, the current link cost can be determined by two network equipments at both two ends, and the current link costs obtained by the two network equipments are processed to obtain the final current link cost of the link; the current link cost of the link may also be determined by one of the two network equipments; since the process for determining the current link cost of the link according to the frame error rate, packet loss rate and other parameters has been described in the foregoing part, the description is not repeated here.

Since in actual application the network equipment according to the embodiment of the disclosure can determine the current link cost of the layer-2 link based on the OAM link monitoring function of Ethernet, when the above network equipment is applied to the layer-2 network, the first determination module 61 specifically can dynamically monitor the link cost using the OAM protocol, that is, can start the link monitoring function of the OAM protocol of Ethernet, dynamically monitor the link cost of the link and report the link cost to the second determination module 62 in time for the subsequent processing; the second determination module 62 specifically can realize the routing backup and dynamic adjustment of the layer-2 switching loop network, wherein when the first determination module 61 reports the current link cost of the link to the second determination module 62, the second determination module 62 can update the cost of the whole loop network and reselect a path for the loop network according to the updated link cost, so as to effectively improve the link cost and reliability of the layer-2 data services; moreover, the second determination module 62 also can initialize the link cost of the link, that is, can execute the process in Step 401.

In addition, the network equipment above also should include a data exchange unit, which is configured to implement the basic Ethernet service layer-2 switching, perform traffic scheduling and monitor service attributes of a link such as Quality of Service (QoS).

To sum up, with the above technical solution of the disclosure, by reference to the current link cost which can accurately reflect the actual condition of a link, the link actually having an optimal link cost can be determined as the main link according to the current link cost, thus the problem in the related art that the transmission efficiency of the whole network is influenced by reason of determining the link actually having a worse link cost as the main link in the link selection based on the initial link cost is avoided, the adjustment on the switching loop can be optimized reasonably, the link having an optimal current link cost is selected as the path of the layer-2 switching loop network, the link having a worse current link cost is blocked, and the transmission efficiency and reliability of the main link and the whole network are improved; in addition, the link cost can be monitored in real time and the switching loop can be updated and adjusted constantly, so that the transmission efficiency of the whole network is guaranteed in real time.

The above are only the preferred embodiments of the disclosure and not intended to limit the disclosure. Any modifications, equivalent substitutions and improvements made within the spirit and principle of the disclosure shall be included within the scope of protection of the disclosure.

The invention claimed is:

1. A method for dynamically adjusting a switching loop, comprising:
   determining, by a network equipment in the switching loop, current link costs of all links connected with the network equipment, wherein the network equipment determines the current link costs of the links according to initial link costs and link adjustment parameters of the links;
   acquiring, by the network equipment, the current link costs of all the links in the switching loop, and determining a main link of the switching loop, wherein the current link cost of the main link is less than or equal to a preset link cost;
   wherein determining, by the network equipment, the current link costs of the links according to the initial link costs and link adjustment parameters of the links comprises:
   $A'=A/(1-V)$, where $A'$ represents the current link cost of the link, A represents the initial link cost of the link, V represents the link adjustment parameter of the link, $0 \leq V < 1$;
   wherein when the link adjustment parameter is the packet loss rate of the link, the packet loss rate V is calculated based on the following formula:
   $V=(P-Q)/P$, where P represents the number of messages sent to the network equipment by another network equipment which is connected with the network equipment through the link, Q represents the number of messages received by the network equipment from the another network equipment.

2. The method according to claim 1, wherein determining a main link of the switching loop comprises:
   preferentially determining the link having the minimum current link cost in the switching loop as the main link of the switching loop.

3. The method according to claim 1, wherein the link adjustment parameter includes one of the following: packet loss rate of a link, frame error rate of a link.

4. The method according to claim 1, wherein the network equipment obtains the number of messages sent/received, through an Operation, Administration and Maintenance (OAM) protocol.

5. The method according to claim 1, wherein when the link adjustment parameter is the frame error rate of the link, the frame error rate V is calculated based on the following formula:
   $V=S/(S+D)$, where S represents the number of bad frames received by the network equipment from another network equipment through the link within a period of time, D represents the number of good frames received by the network equipment from the another network equipment through the link within the period of time.

6. The method according to claim 1, further comprising:
   preferentially determining the link having the maximum current link cost in the switching loop as the link needing to be blocked.

7. A network equipment, comprising: a first determination module and a second determination module, wherein the first determination module is configured to determine current link costs of all links connected with the network equipment, wherein the network equipment determines the current link costs of the links according to initial link costs and link adjustment parameters of the links; and the second determination module is configured to acquire the current link costs of all the links in a switching loop in which the network equipment is located, and to determine a main link of the switching loop, wherein the current link cost of the main link is less than or equal to a preset link cost;

wherein the first determination module and the second determination module are each the result of execution on a processor of the network equipment of software stored in a memory of the network equipment;

wherein the first determination module determines the current link costs of the links according to the following formula:
$A'=A/(1-V)$, where $A'$ represents the current link cost of the link, A represents initial link cost of the link, V represents the link adjustment parameter of the link, $0 \leq V < 1$;

wherein when the link adjustment parameter is the packet loss rate of the link, the packet loss rate V is calculated based on the following formula:
$V=(P-Q)/P$, where P represents the number of messages sent to the network equipment by another network equipment which is connected with the network equipment through the link, Q represents the number of messages received by the network equipment from the another network equipment.

8. The network equipment according to claim 7, wherein the link adjustment parameter includes one of the following: packet loss rate of a link, frame error rate of a link.

9. The network equipment according to claim 7, wherein the second determination module is specifically configured to preferentially determine the link having the minimum current link cost in the switching loop as the main link of the switching loop, and to preferentially determine the link having the maximum current link cost in the switching loop as the link needing to be blocked.

10. The method according to claim 2, further comprising:
    preferentially determining the link having the maximum current link cost in the switching loop as the link needing to be blocked.

11. The method according to claim 3, further comprising:
    preferentially determining the link having the maximum current link cost in the switching loop as the link needing to be blocked.

12. The method according to claim 4, further comprising:
    preferentially determining the link having the maximum current link cost in the switching loop as the link needing to be blocked.

13. The method according to claim 5, further comprising:
    preferentially determining the link having the maximum current link cost in the switching loop as the link needing to be blocked.

14. The network equipment according to claim 8, wherein the second determination module is specifically configured to preferentially determine the link having the minimum current link cost in the switching loop as the main link of the switching loop, and to preferentially determine the link having the maximum current link cost in the switching loop as the link needing to be blocked.

* * * * *